United States Patent [19]

Pitochelli et al.

[11] Patent Number: 5,660,874

[45] Date of Patent: Aug. 26, 1997

[54] METHOD OF PROTECTING STEEL WATER HANDLING FACILITIES FROM CORROSION

[75] Inventors: Anthony R. Pitochelli, Kingwood; Lawrence M. Cenegy, The Woodlands; James D. Watson, Houston; John G. Garcia, Jr., Stafford, all of Tex.

[73] Assignee: Nalco/Exxon Energy Chemicals, L.P., Sugarland, Tex.

[21] Appl. No.: 601,082

[22] Filed: Feb. 14, 1996

[51] Int. Cl.⁶ .................................................. B05D 7/22
[52] U.S. Cl. .................. 427/8; 427/239; 427/435; 427/443.1
[58] Field of Search ................... 427/8, 239, 435, 427/443.1

*Primary Examiner*—Bernard Pianalto
*Attorney, Agent, or Firm*—R. L. Graham

[57] ABSTRACT

Corrosion by water of mild steel pipe is inhibited by the controlled addition of $NaHCO_3$ to the water (containing calcium ions) in sufficient amounts to induce corrosion and form scale. The scale deposits on the pipe at the corrosion sites form a protective film thereon. The addition of the $NaHCO_3$ is controlled by the use of corrosion electrode probes placed in the pipe.

19 Claims, 2 Drawing Sheets

METHOD OF PROTECTING STEEL WATER HANDLING FACILITIES FROM CORROSION

BACKGROUND OF THE INVENTION

The present invention relates generally to a method for forming an effective scale on piping and other facilities which handle corrosive water streams. In one aspect, the invention relates to a method for protecting mild steel facilities from corrosion by water containing dissolved salts (e.g. sea water). In a particular embodiment of the invention, the method relates to a method of protecting mild steel facilities from the corrosive effects of water containing oxidizing treating agents. In still another aspect of the invention, the method relates to a method of protecting mild steel from the corrosive effects of aqueous solutions of chlorine dioxide.

Aqueous solutions of chlorine based oxidizing agents have long been used in the treatment of industrial water, municipal water, and oil field water flooding operations for purification of the water, odor control, and as a biocide. Chlorine dioxide, for example, has been used in the treatment of water containing phenol, the treatment of water as a biocide for oil field water flooding system, and the purification of industrial and municipal water systems.

Although chlorine dioxide and the other oxidizing agents are quite effective in the treatments noted above, they present a serious problem because of their high corrosivity. The use of organic corrosion inhibitors has not proven cost effective. Moreover, the use of corrosion-resistant alloy steels in many operations is cost prohibitive.

As will be described in detail below, the present invention involves a method for forming a protective scale coating on the interior surface of the pipe or other facilities. The protective coating is an inorganic scale inhibitor formed in situ. The scale results in part from the corrosion reaction products formed during the process of induced corrosion described below. The present method does not involve the use of any of the organic film forming corrosion inhibitors, but does not preclude their use.

The use of controlled calcium carbonate scale for corrosion protection has long been known. An early article published in Industrial and Engineering Chemistry in 1945 and entitled "Corrosion Prevention by Controlled Calcium Carbonate Scale" states that "the deliberate production of calcium carbonate scale to protect water distribution systems is carried out by many municipal water treatment plants and has been applied widely in the industry." The control of the scaling rate and thickness is by temperature, pH, and addition of lime and acid. The scale described in this process, however, is crystalline scale formation.

A 1936 article entitled "The Analytical Control of Anti-corrosion Water Treatment", authored by W. F. Langelier recognized that certain products of the corrosive action can be deposited on the boundary surface as a scale thereby protecting the surface from corrosive effects of the water. The article further describes a method of adding lime to increase the concentration of calcium ions and carbonate ions simultaneously. The deposition of the calcium carbonate as a protective scale on the pipes appear to be crystalline deposition resulting from supersaturated solutions.

U.S. Pat. No. 4,678,685 discloses a method wherein water supersaturated with calcium carbonate precipitates crystalline calcium carbonate on the metal surfaces. The suspended calcium carbonate presents operational problems since excessive amounts of the suspended calcium carbonate must be removed during the filming step.

U.S. Pat. No. 5,051,281 discloses a method of developing calcium carbonate scale on metal using powdered lime. The scaling of the pipe relies on the use of particles of solid lime in the water to form a precipitate of calcium carbonate, which adheres to the pipe wall.

U.S. Pat. Nos. 5,084,210 and 5,064,612 disclose organic corrosion inhibitors used in connection with the treatment of aqueous solutions of chlorine dioxide to protect metal surfaces against corrosion.

U.S. Pat. No. 4,945,992 discloses the use of sodium dichromate as a corrosion inhibitor for chlorine dioxide systems. Due to environmental concerns, it is not possible to use chromates in many systems.

SUMMARY OF THE INVENTION

The present invention relies on the in-situ formation and deposition of scale to form a protective film or coating on ferrous metals and involves three main steps: (1) induced corrosion and scaling step by the addition of a metal bicarbonate, (2) monitoring of corrosion step, and (3) discontinuation of the addition of the metal bicarbonate once protection is achieved.

The induced corrosion and scaling step involves adding sufficient amount of metal bicarbonate to an aqueous liquid containing calcium ions to increase the corrosion rate of the aqueous liquid on ferrous metal. The corrosion rate will increase until the scale forms a protective film at the corrosion site, at which time the corrosion rate declines.

The monitoring step involves monitoring the corrosion rate of the aqueous liquid to determine the point at which a protective film is formed on the ferrous metal. The monitoring step can be carried out by using an electrical instrument with probes placed in the aqueous liquid. During initial treatments, the instrument preferably should be capable of providing continuous readings at frequent intervals (e.g. at least one per minute) to enable adjustments in treating rates. Once protection is achieved (as indicated by the monitoring step), the readings may be at longer time intervals.

The typical corrosion profile resulting from the controlled scale deposition in accordance with the present invention will be as follows:

(a) A base corrosion rate of the aqueous liquid is determined.

(b) The corrosion rate increases by the addition of the bicarbonate and reaches a maximum, at which time (c) the corrosion rate decreases as the in situ film is formed at the corrosion sites.

(d) The corrosion rate declines to a level which provides adequate protection of the ferrous metal, at which time the injection of the bicarbonate is discontinued.

(e) The corrosion rate remains low for a relatively long period of time after injection of the bicarbonate, indicating the good integrity and durability of the protective film.

In a preferred embodiment, the method of the present invention involves the steps of:

(a) flowing an aqueous liquid containing calcium ions on a ferrous pipe or container;

(b) adding a metal bicarbonate to the aqueous liquid to increase corrosion and scaling;

(c) monitoring the corrosion rate of the aqueous liquid to determine the maximum corrosion rate and the effects on corrosion of the scaling as indicated by a decrease in the corrosion rate from the maximum corrosion rate, and (d) discontinuing the addition of the metal bicarbonate when the corrosion rate has decreased to a predetermined level (preferably, not more than 30% and, most preferably, 0 to 20% of the maximum corrosion rate determined in step (c)).

When the corrosion protective film is established, oxidizing agents such as chlorine based oxidizing agents ($ClO_2$) may be added to the aqueous liquid.

In practice the monitoring step will be carried out on corrosion probes placed in the aqueous liquid stream.

The monitoring step may continue to ensure continued protection. When the film no longer provides adequate protection, steps (b)–(d) may be repeated to restore the protection.

The preferred bicarbonates are sodium bicarbonate, potassium bicarbonate, and mixtures thereof.

DESCRIPTION OF THE PREFERRED EMBODIMENTS

Figure 1:
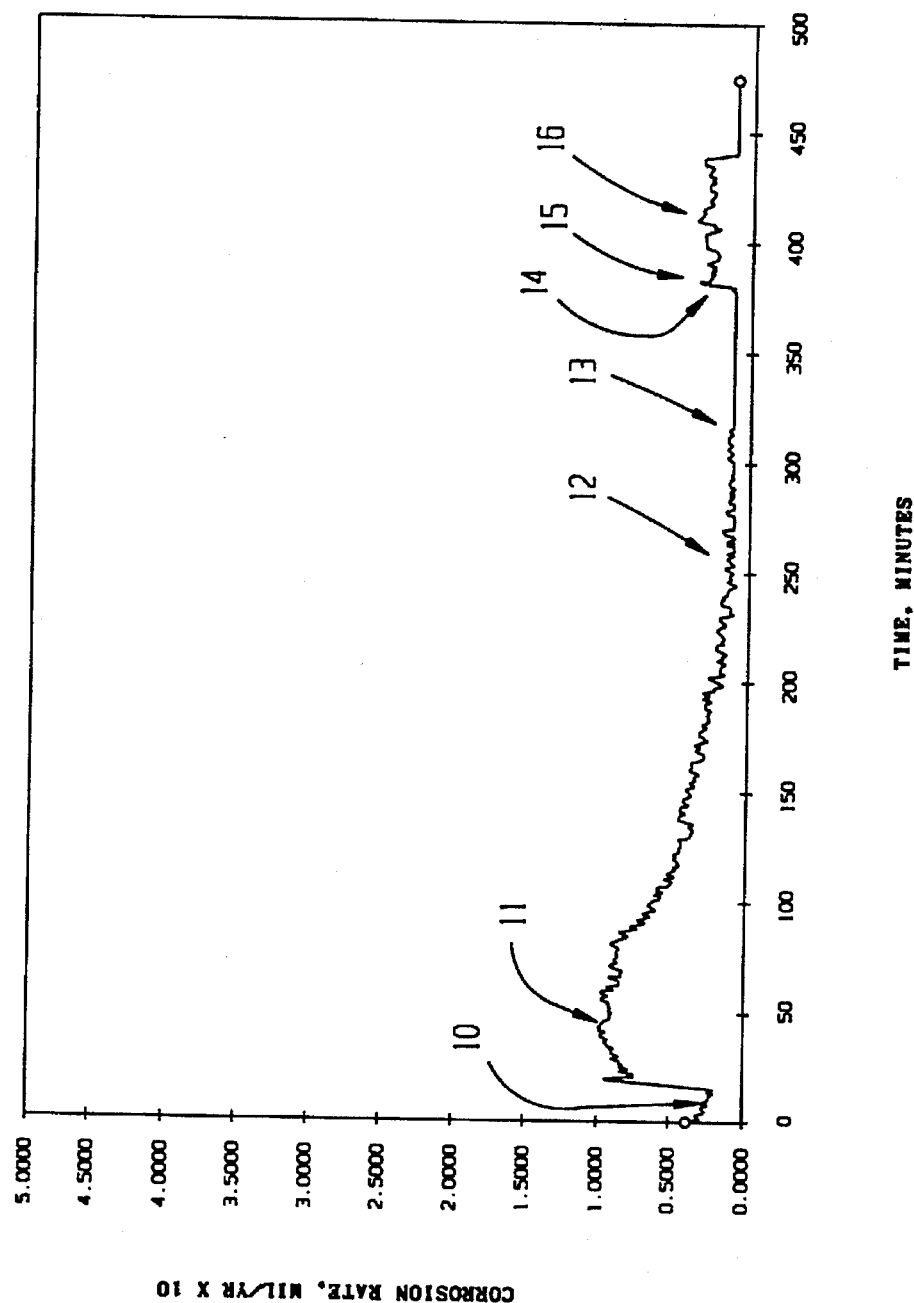
FIG. 1 is a plot showing the corrosive behavior of $NaHCO_3$ addition to water and subsequent addition of $ClO_2$ into the water.

As indicated above, the method of the present invention involves (1) the controlled addition of a metal sodium bicarbonate to water containing calcium ions to induce corrosion and scaling and (2) the monitoring of the corrosion rate which provides an indication of the filming activity at corrosion sites. A protective film is developed in situ of the water and deposits on the bare metal providing a protective film. It is believed that the protective film is developed by two reactions (using $NaHCO_3$):

(1) Scale formed by the corrosion reaction:
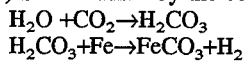
$H_2CO_3 + Fe \rightarrow FeCO_3 + H_2$ (2) Scale forming reaction of sodium bicarbonate in water containing calcium:
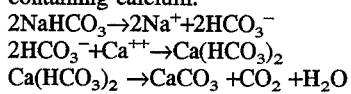
$2HCO_3^- + Ca^{++} \rightarrow Ca(HCO_3)_2$
$Ca(HCO_3)_2 \rightarrow CaCO_3 + CO_2 + H_2O$ The effectiveness of the method is dependent upon the type of metal being protected, the type of water being treated, the amount of sodium bicarbonate added, and the monitoring of the corrosion rate. Each of these factors is discussed separately below.

Protected Metal

Since the effectiveness of the present invention is dependent in part on the corrosion products of the steel used in the piping or facilities, the steel must be susceptible to corrosion by the carbonic acid generated by the sodium bicarbonate. Although any type of ferrous metals may be used, it is preferred to use plain carbon steels (mild steel) which represent by far the major percentage of use in the water handling facilities. Plain carbon steel is defined as commercial iron that contains carbon in any amount up to 1.7% as an essential alloying agent. Corrosion resistant alloys such as stainless steels are not susceptible to corrosion by the carbonic acid and therefore would not result in the in-situ production of the ferrous carbonate scale.

Water

The water must contain a sufficient amount of calcium ions to produce the calcium carbonate scale. Sea water which contains from 300 to 500 ppm of calcium ions is ideally suited for use in the present invention. Also, if the water does not contain sufficient amount of calcium ions, calcium can be added in the form of any soluble calcium salt such as Calcium chloride to increase the $Ca^{++}$ content to a level in excess of 10 ppm (preferably in excess of 50 ppm, and most preferably in excess of 100 ppm) in the water.

Metal Bicarbonate

The preferred metal bicarbonate is sodium bicarbonate which may be used alone or may used as a mixture with a small amount of the bicarbonate such as potassium carbonate. The amount of carbonate added to the water is carefully controlled to produce the proper amount of scaling. The optimum amount of bicarbonate added can be determined by trial and error, using the monitoring step described below. The sodium bicarbonate may be introduced into the stream as a concentrated aqueous solution by use of conventional chemical injection equipment. Normally, however, from 1 to 10%, preferably 2 to 8% of the bicarbonate in a concentrated aqueous solution will be sufficient for most operations. Care should be taken to avoid exceeding the saturation limit of the bicarbonate, as this could result in accumulation and plugging in the facilities. Generally, the treated water will contain from 0.5 to 1 wt % of the bicarbonate.

Monitoring of Corrosion

Although a number of instruments are commercially available for monitoring corrosion, including test coupons exposed to the stream, chemical analysis of the stream for soluble iron, and electrical resistance probes, the preferred method is the use of a linear polarization resistance probe placed in the stream. Corrosion rate is determined by electro-chemical methods. The monitoring technique must be sufficiently rapid to allow adjustments in the bicarbonate solution feed if necessary. Continuous monitoring is preferred, but digital instruments may be used, provided output readings are sufficiently rapid (e.g. at least one reading per minute) during initial treatment. As indicated above, once protection is achieved, longer intervals between readings are possible depending on several factors, including corrosion rate, expected protection time, safety, etc. Under some circumstances time intervals between monitor readings (once initial protection is achieved) may be several hours or days.

The probes must be selected for their ability to measure corrosion of the carbon steel being protected in the corrosive environment.

Corrator electrode probes (e.g. Model 9030, a linear polarization resistance system manufactured by Rohrbach-Cosasco), have given good results in the method of the present invention.

The probes are placed downstream from the injection point of the bicarbonate. The distance of the first probe downstream may vary, but at least ¼ foot to 100 feet is sufficient for most pipeline operations. It is also preferred to install probes throughout the system being protected to monitor corrosion at key locations. The corrator system may be calibrated to provide corrosion rate in mils per year.

The probes may be connected to an analog output with recorders.

Oxidizing Agent

Inadequate inhibition of corrosion from aqueous solutions containing strong oxidizing agents is an extremely serious problem. The organic corrosion inhibitors have not proven successful. The chlorine based oxidizing agents for which the present invention is ideally suited includes chlorine dioxide, the hypochlorites, and chlorites, as well as non-chlorinated ozone, and oxygen. The present invention has been exemplified with the use of chlorine dioxide, which is receiving increased use as biocide and oxidizing agent for controlling bacteria, scavenging sulfides, and removing organic and inorganic contaminants in a variety of applications including municipal water treatment, food processing, oil field water flooding operations, mineral processing, and the like. Chlorine dioxide is also applicable in toxic waste cleanups.

The chlorine dioxide may be used as an aqueous solution generated at the site of use. As is known, chlorine dioxide is a highly reactive gas which is soluble in water. Because of its reactivity, it is common for chlorine dioxide to be generated at the point of use and used immediately. Several methods of on site preparation of chlorine dioxide are described, as for example, in U.S. Pat. Nos. 4,077,879, 4,247,531, and 4,590,057, all of which are incorporated herein by reference.

Alternatively, chlorites and other oxidizing agents may be added directly to the water in the form of pellets, powder, or as concentrated aqueous solutions.

The amount of oxidizing agent used in the water, of course, will depend upon the type of chemical, the type of water treatment, and the degree of treatment dosage needed. When used as a biocide, generally concentrations of 1 to 100 ppm, preferably 5 to 50 ppm, will be in the range of most treatments. In chlorine dioxide treated systems, treatment is generally in the range of 1 to 3 ppm above demand for most biocidal applications (residual $ClO_2$).

Although the present invention has particular advantageous application in the treatment of highly corrosive systems such as aqueous systems containing chlorine-based oxidizing agents, it also has applications in other corrosive aqueous systems such as aqueous systems that are not oxygen free.

Operations

In operations, the point of injection of the bicarbonate is determined and the injection facilities are installed. For convenience, it is preferred that the injection facilities be in a pipe portion of the facility so that the bicarbonate is injected directly into and distributed in a stream. The corrosion probe of the corrosion measuring instrument is installed in the pipe downstream of the injection point, preferably at a distance that the bicarbonate has been sufficiently disbursed and dissolved in the stream. As indicated above, this distance will be generally greater than 0.25 feet, preferably at least one foot.

Care should be taken to ensure the water has sufficient calcium ions. If necessary, any soluble calcium salt can be added to the water to increase the calcium ions.

The water is flowed through the pipe at operating rate and the base line corrosion rate of the water is determined by the corrosion measuring instrument, indicated at 10 on FIG. 1. The injection of the bicarbonate is then commenced and the corrosion rate of the aqueous solution of the bicarbonate determined. It is preferred to inject the bicarbonate in an oxygen free environment to limit the principal corrosive agent to the bicarbonate.

Figure 2:
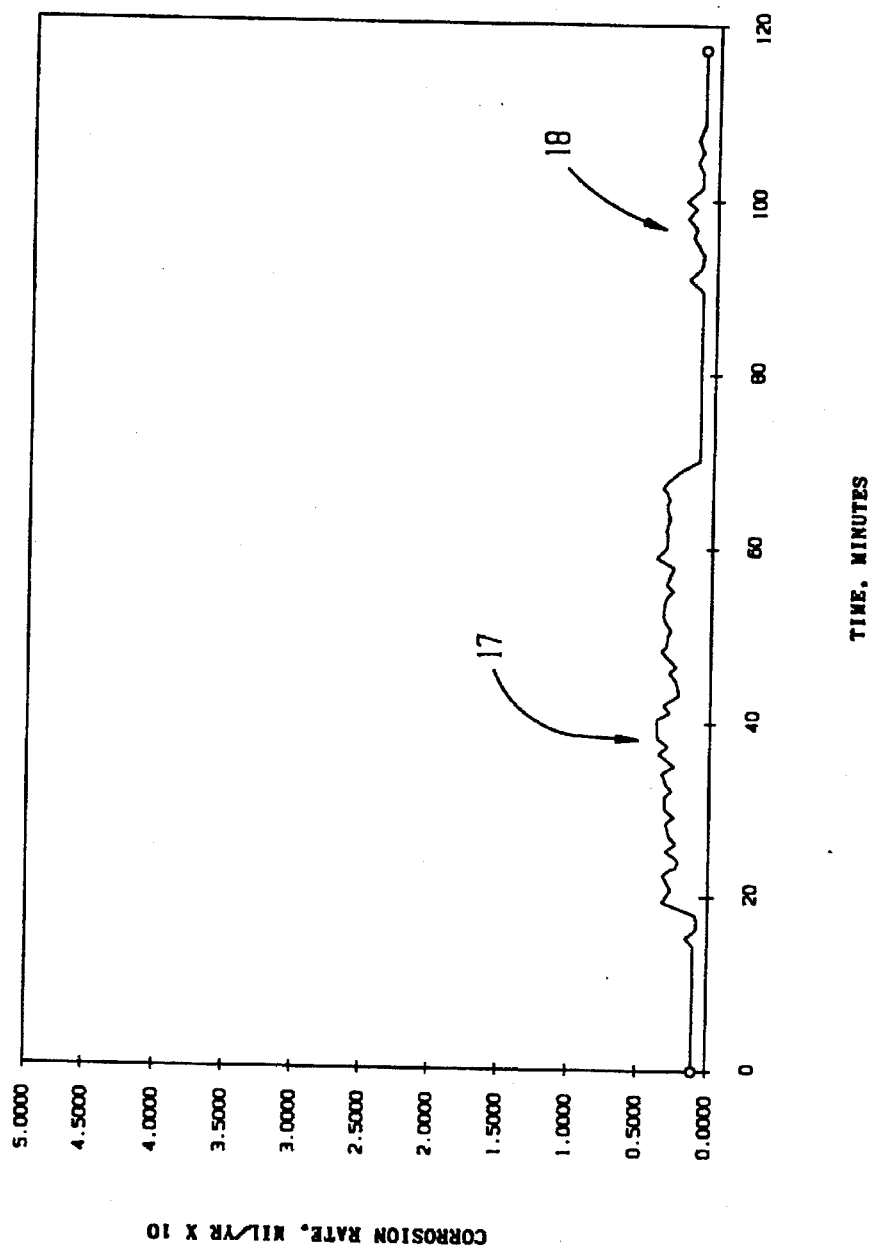
FIG. 2 is a plot showing monitored corrosion rates for intermittent additions of $ClO_2$ in water.

The corrosion rate is monitored. As shown in FIG. 1, the corrosion rate will initially increase from base line 10 to a maximum as indicated by numeral 11 on FIG. 1. However, as the scale forms a protective film on the probe, the corrosion rate will gradually decrease over a period of a few hours (typically 3 to 4 hours) to a minimum indicated at numeral 12 on FIG. 1. The bicarbonate injection will be discontinued when the corrosion rate has decreased by a predetermined amount, generally from 0 to 30% (preferably 0 to 20%) of the maximum corrosion rate indicated by numeral 11. At this point the bicarbonate injection is discontinued. The addition of the oxidizing agent is then commenced (indicated by numeral 14) and may be continued for a predetermined length of time. Although the time of injection of the oxidizing agent may be as long as desired, it is most common to inject the oxidizing agent in intermittent intervals. As shown in FIG. 1, the corrosion rate increases (as indicated by 15) as the aqueous solution of the oxidizing agent passes the probe. In FIG. 1, the oxidizing agent was injected for about 1 hour. FIGS. 1 and 2 illustrate sequential injection of $ClO_2$. The first injection period illustrated by 16 lasted for about one hour, the second injection period 17 for about 50 minutes, and the third injection period 18, for about 25 minutes.

During operations, the treatment of the bicarbonate may be repeated if the monitoring indicates that the protective film loses its effect.

Experiments

A flow loop consisting of half inch diameter stainless steel pipe was equipped with a linear polarization corrosion probe (Model 9030 manufactured by Rohrbach-Cosasco). The probe was connected to a strip chart recorder. A conventional injection pump was used to inject the additives into the water. The probe was located about 3 inches downstream of the injection point. The water was sea water containing 400 ppm of calcium ions and was flowed through the loop at a rate of 0.5 gph.

Initially, sodium bicarbonate was injected into the stream to provide a concentration of 2500 ppm of sodium bicarbonate. (The system was maintained oxygen free throughout the test.) As shown in FIG. 1, the initial or base rate corrosion of the sea water was about 2 mils per year (MPY). Upon injection of the bicarbonate the corrosion rate increased to a maximum of about 10 MPY and declined over a period of 6 hours to about 2 MPY and further declined to almost 0. After 5.3 hours, the bicarbonate injection was discontinued. The injection of aqueous chlorine dioxide was then commenced at a concentration of 11.2 ppm. The chlorine dioxide was generated in the lab. When the chlorine dioxide solution contacted the probe, the corrosion rate immediately increased to about 2 MPY and maintained constant over the 1 hour injection period. Intermittent injection of the chlorine dioxide as shown in FIG. 2 did not increase the corrosion rate. The amount of $ClO_2$ in the three injection periods following the $NaHCO_3$ injection was 11.2 ppm for injection period 16 (FIG. 1), and 20.7 ppm and 8.7 ppm for injection periods 17 and 18 (FIG. 2).

The tests were duplicated to determine the corrosion rate of the aqueous chlorine dioxide without any treatment in accordance with the present invention. Aqueous solutions of chlorine dioxide were intermittently injected into water to provide various concentrations, ranging from 6.2 to 14.8 ppm. The injection periods varied from 30 to about 60 minutes each, with about the same time for noninjection of chlorine dioxide for each injection period. The corrosion rates during these injection periods ranged from about 20 MPY for the lower chlorine dioxide concentrations to about 40 MPY for the higher concentration $ClO_2$ treatments.

The test results revealed that the treatment in accordance with the present invention not only reduces corrosion of aqueous solutions of chlorine dioxide, but has long term effects. The durability and integrity of the film appeared to hold for several hours. Although the reasons for the improved results are not fully understood, it is believed that the interaction of the iron carbonate base scale with the calcium carbonate surface scale contribute to the long term protective film formed on the bare metal.

What is claimed is:

1. In a method of forming a protective scale on a ferrous metal facility through which a corrosive water stream containing at least 10 ppm of calcium is flowed, the improvement comprising:
    (a) adding a metal bicarbonate to the water stream to a level of 10 to 5,000 ppm to form an aqueous solution of the metal bicarbonate in the water stream, said metal bicarbonate being selected from the group consisting of $NaHCO_3$, $KHCO_3$, and mixtures thereof;
    (b) monitoring the corrosion rate in the water stream containing the metal bicarbonate to determine the increase in corrosion rate of the water;
    (c) continuing the addition of the metal bicarbonate to form a protective scale on the ferrous metal, and continuing monitoring until the corrosion rate has declined to a level of 30% or less of the maximum corrosion rate determined in step (b); and
    (d) thereafter discontinuing the addition of the sodium bicarbonate.

2. The method of claim 1 wherein the metal bicarbonate is $NaHCO_3$.

3. The method of claim 1 wherein the scale is protective against an oxidizing agent added to the water stream after discontinuing the injection of the metal bicarbonate.

4. The method of claim 3 wherein the oxidizing agent is a chlorine-based oxidizing agent.

5. The method of claim 4 wherein the oxidizing agent is $ClO_2$.

6. The method of claim 5 wherein the amount of $ClO_2$ injected provides a water stream containing from 1 to 100 ppm $ClO_2$ dissolved therein.

7. The method of claim 1 wherein the ferrous metal is plain steel which is corroded by the $NaHCO_3$ water solution.

8. In a method of forming a protective scale and monitoring its formation on mild steel facilities wherein a corrosive water stream containing at least 10 ppm of calcium is flowed through the facility, the improvement comprising:
    (a) determining the corrosion rate of the water stream;
    (b) injecting sufficient amount of sodium bicarbonate into the water stream to induce corrosion and form scale, the concentration of the sodium bicarbonate being sufficient to cause the water stream to become saturated with respect to calcium carbonate;
    (c) monitoring the corrosion rate of the water stream containing the bicarbonate until the corrosion rate is equal to or below the corrosion rate of the water stream determined in step (a);
    (d) thereafter discontinuing the addition of sodium bicarbonate; and
    (e) thereafter adding a corrosive treating agent to the water stream.

9. A method of forming a protective film on a ferrous metal which comprises:
    (a) flowing a stream of aqueous liquid containing calcium ions therein through a ferrous metal pipe;
    (b) continuously adding $NaHCO_3$ to the aqueous liquid to form a solution of the $NaHCO_3$ therein, said aqueous $NaHCO_3$ increasing the corrosion rate of the metal pipe;
    (c) monitoring the corrosion rate of the aqueous solution of the $NaHCO_3$ to determine its corrosion rate profile; and
    (d) discontinuing the addition of the $NaHCO_3$ when the monitored corrosion rate of step (c) passes through a maximum and declines to a level less than 30% of the maximum of the profile.

10. The method of claim 9 wherein the amount of $NaHCO_3$ added to the water stream is sufficient to provide the water with at least 10 ppm $HCO_3^-$.

11. The method of claim 9 wherein the monitoring step is carried out by a linear polarization resistance probe positioned in the pipe downstream of the addition point.

12. The method of claim 11 wherein the probe is placed in the pipe at least 0.25 foot downstream of the bicarbonate injection point.

13. The method of claim 9 wherein an aqueous solution of a chlorine-based oxidizing agent is added to the water after step (d).

14. The method of claim 13 wherein the amount of $ClO_2$ provides the water a concentration of 1 to 3 ppm residual $ClO_2$.

15. The method of claim 13 wherein the $ClO_2$ is added to the stream intermittently in a time period ranging from 10 to 240 minutes.

16. A method for the controlled deposition of scale to protect metal against corrosion, which comprises:
    (a) flowing water through a ferrous pipe;
    (b) placing a corrosion probe in the water flowing through the pipe;
    (c) adding a metal bicarbonate to the water upstream of the probe in sufficient amount to produce a fill of scale on the probe;
    (d) monitoring the corrosion rate of the water containing the metal bicarbonate to determine the corrosion inhibition effects of the film of scale deposited on the probe; and
    (e) discontinuing the addition of the metal bicarbonate when the corrosion rate as monitored in step (d) declines to a level of 30% or less of the maximum corrosion rate measured in step (d).

17. The method of claim 16 and further comprising:
    (e) adding an oxidizing agent to the water after discontinuing the addition of the metal bicarbonate; and
    (f) continuing the monitoring of the corrosion rate of the water on the probe.

18. The method of claim 16 and further comprising repeating steps (b)–(d) when the corrosion rate increases to a predetermined level as determined in step (f).

19. The method of claim 16 wherein the monitoring step is continuous.

* * * * *

UNITED STATES PATENT AND TRADEMARK OFFICE
CERTIFICATE OF CORRECTION

PATENT NO. : 5,660,874
DATED : August 26, 1997
INVENTOR(S) : Anthony R. Pitochelli, Lawrence M. Cenegy, James D. Watson, John G. Garcia It is certified that error appears in the above-indentified patent and that said Letters Patent is hereby corrected as shown below:

Column 8, Claim 16, Line 41

...to produce a fill of scale

SHOULD READ AS:

...to produce a *film* scale

Signed and Sealed this

Ninth Day of December, 1997

Attest:

Attesting Officer

BRUCE LEHMAN

Commissioner of Patents and Trademarks